US009946569B1

(12) United States Patent
Beedu et al.

(10) Patent No.: US 9,946,569 B1
(45) Date of Patent: Apr. 17, 2018

(54) VIRTUAL MACHINE BRING-UP WITH ON-DEMAND PROCESSING OF STORAGE REQUESTS

(71) Applicant: Nutanix, Inc., San Jose, CA (US)

(72) Inventors: Bharat Kumar Beedu, Santa Clara, CA (US); Parthasarathy Ramachandran, Palo Alto, CA (US); Kshitiz Jain, Raipur Chattisgarh (IN)

(73) Assignee: Nutanix, Inc., San Jose, CA (US)

( * ) Notice: Subject to any disclaimer, the term of this patent is extended or adjusted under 35 U.S.C. 154(b) by 1 day.

(21) Appl. No.: 15/018,395

(22) Filed: Feb. 8, 2016

(51) Int. Cl.
*G06F 9/46* (2006.01)
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
CPC ....... G06F 9/45558; G06F 2009/4557; G06F 2009/45583; G06F 2009/45595
See application file for complete search history.

(56) References Cited

U.S. PATENT DOCUMENTS

| 7,640,409 | B1 * | 12/2009 | Stafford | ............... G06F 3/0605 707/999.202 |
| 8,903,888 | B1 * | 12/2014 | Hyser | ............... G06F 9/45558 709/202 |
| 9,256,475 | B1 | 2/2016 | Aron | |
| 9,565,189 | B1 | 2/2017 | Gill et al. | |
| 9,575,784 | B1 | 2/2017 | Aron et al. | |
| 9,619,490 | B2 | 4/2017 | Aron et al. | |
| 2006/0005189 | A1 | 1/2006 | Vega et al. | |
| 2008/0222234 | A1 | 9/2008 | Marchand | |

(Continued)

FOREIGN PATENT DOCUMENTS

WO WO2016109743 A1 7/2016

OTHER PUBLICATIONS

VMware, Inc., "VMware vSphere vMotion: 5.4 times faster than Hyper-V Live Migration", Virtual Machine Migration Comparison: VMware vSphere vs. Microsoft Hyper-V, A Principled Technologies Test Report, Oct. 2011, 36 pages.

*Primary Examiner* — Camquy Truong
(74) *Attorney, Agent, or Firm* — Vista IP Law Group, LLP

(57) ABSTRACT

A method commences upon receiving a request to migrate a subject virtual machine from a first computing machine to a second computing machine. An agent determines which storage assets are used by the subject virtual machine. The agent collects volume metadata pertaining to the storage assets and clones volume metadata from the first computing machine to the second computing machine. The data blocks comprising the volumes are not moved to the second computing machine until after migrating the subject virtual machine from the first computing machine to the second computing machine. After starting the migrated instance of the subject virtual machine, the migrated instance mounts volumes using the cloned metadata. The first computing machine and the second computing machine cooperate by processing storage asset block requests issued by the migrated virtual machine. Data blocks comprising the volume are moved on demand. The migrated virtual machine can be migrated yet again.

20 Claims, 13 Drawing Sheets

(56) References Cited

U.S. PATENT DOCUMENTS

| | | |
|---|---|---|
| 2008/0270564 A1 | 10/2008 | Rangegowda et al. |
| 2009/0172165 A1 | 7/2009 | Rokuhara et al. |
| 2010/0332889 A1 | 12/2010 | Shneorson et al. |
| 2011/0010515 A1 | 1/2011 | Ranade |
| 2011/0185292 A1 | 7/2011 | Chawla et al. |
| 2011/0270945 A1* | 11/2011 | Shiga .................... G06F 3/0605 709/213 |
| 2011/0320556 A1 | 12/2011 | Reuther |
| 2012/0137098 A1 | 5/2012 | Wang et al. |
| 2013/0014103 A1 | 1/2013 | Reuther et al. |
| 2014/0215459 A1* | 7/2014 | Tsirkin ................ G06F 9/45558 718/1 |
| 2015/0326531 A1 | 11/2015 | Cui et al. |
| 2016/0188232 A1 | 6/2016 | Ramachandran et al. |
| 2016/0203013 A1 | 7/2016 | Bayapuneni et al. |
| 2017/0250976 A1 | 8/2017 | Ramachandran et al. |

\* cited by examiner

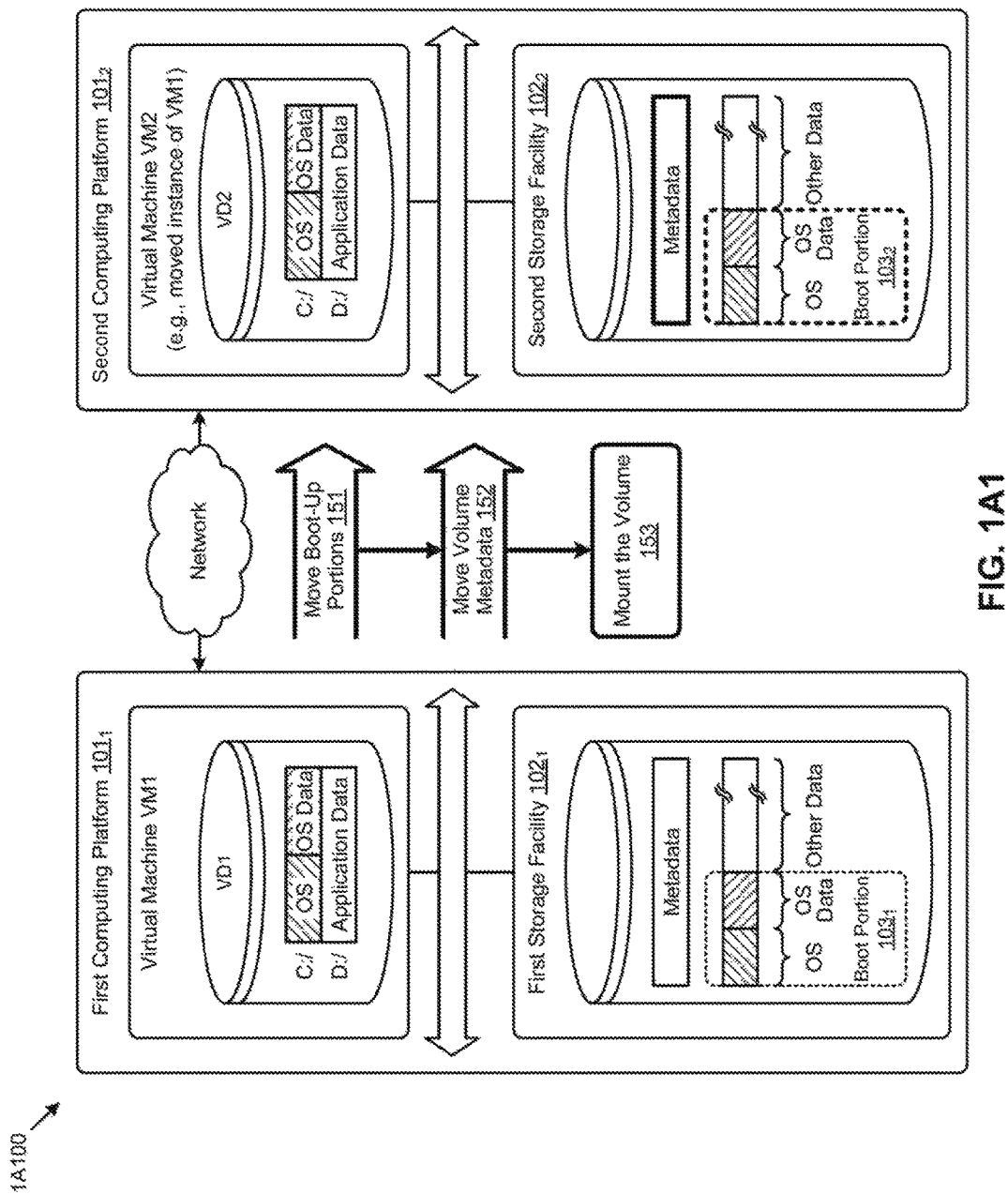
FIG. 1A1

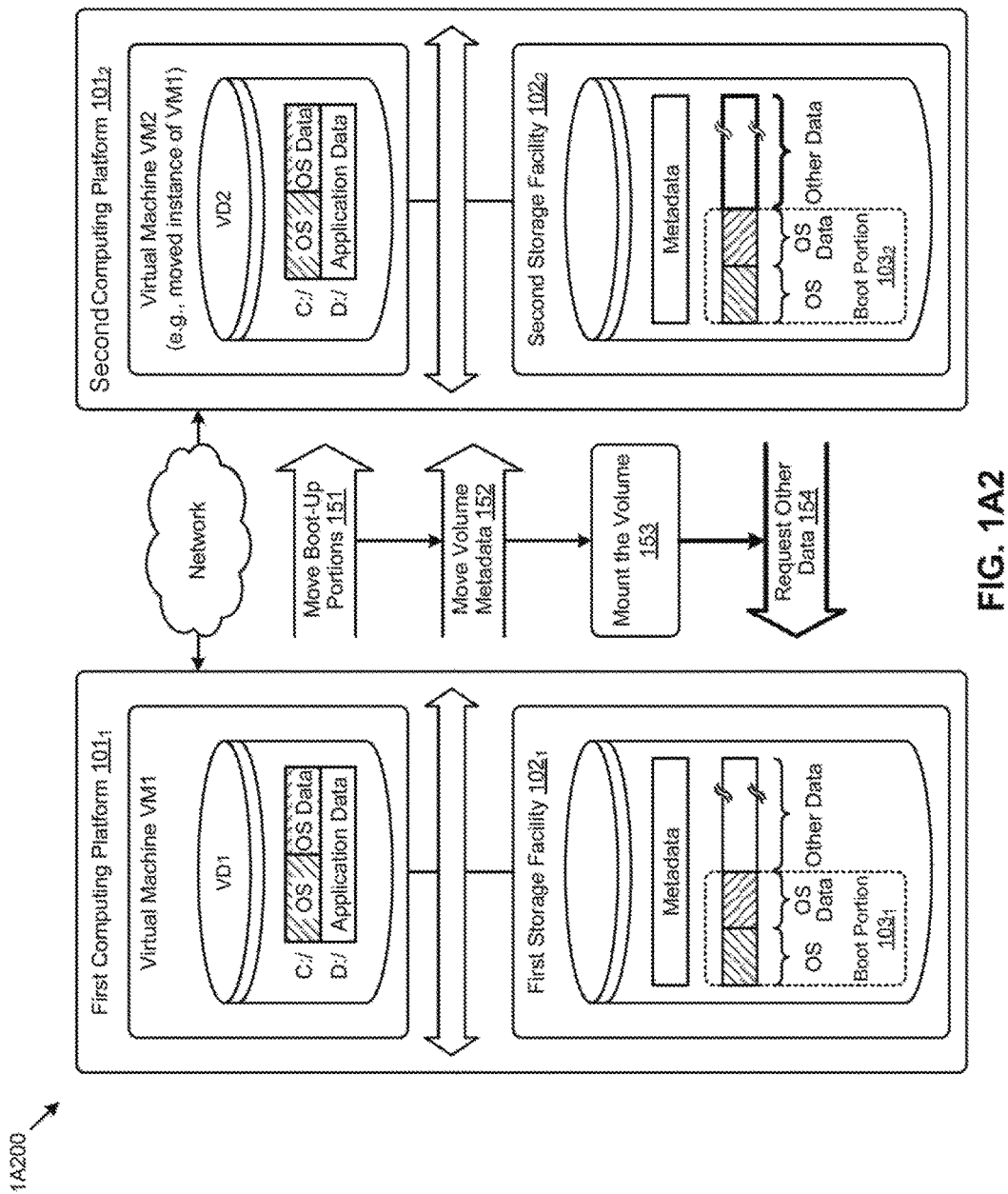

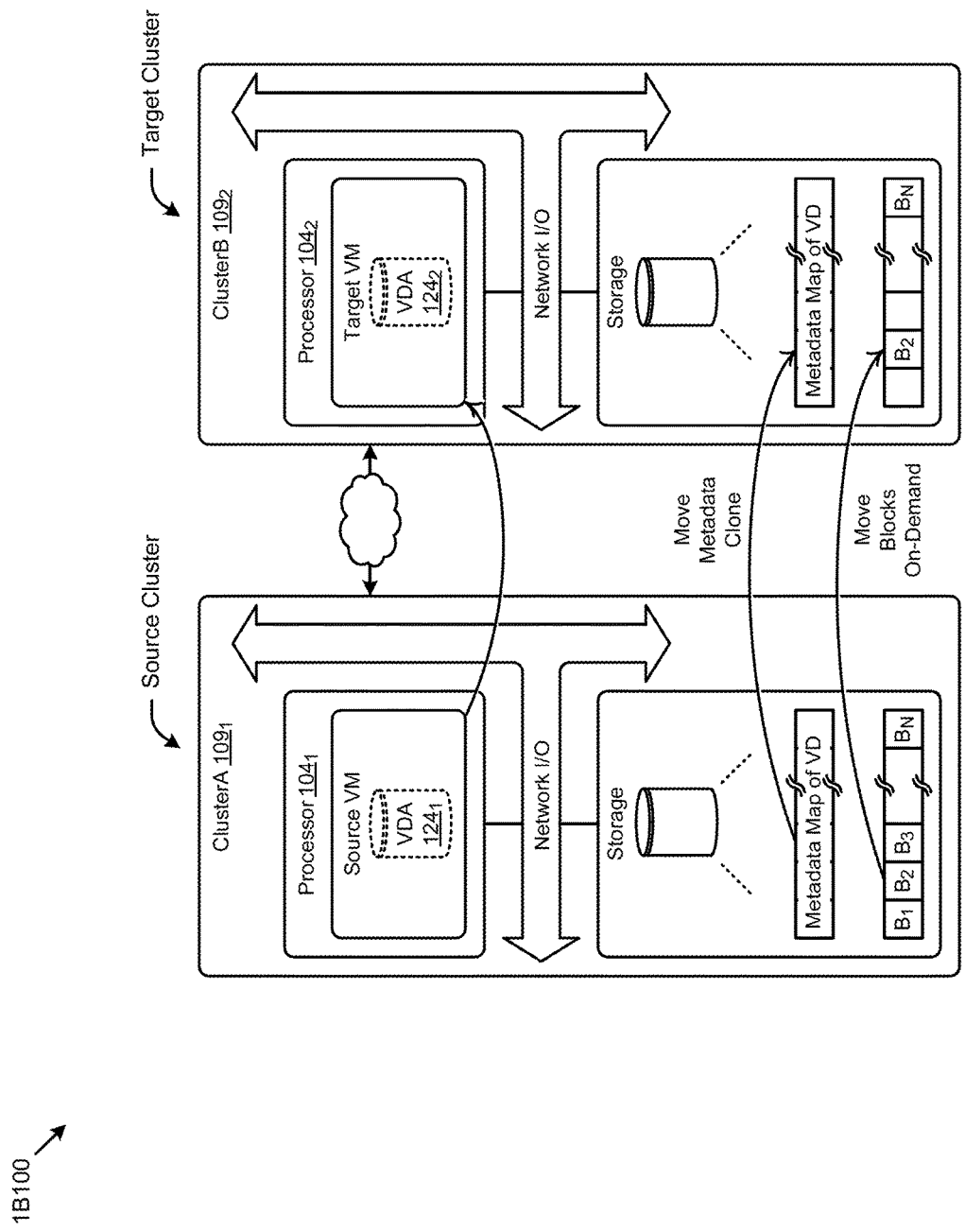
FIG. 1B1

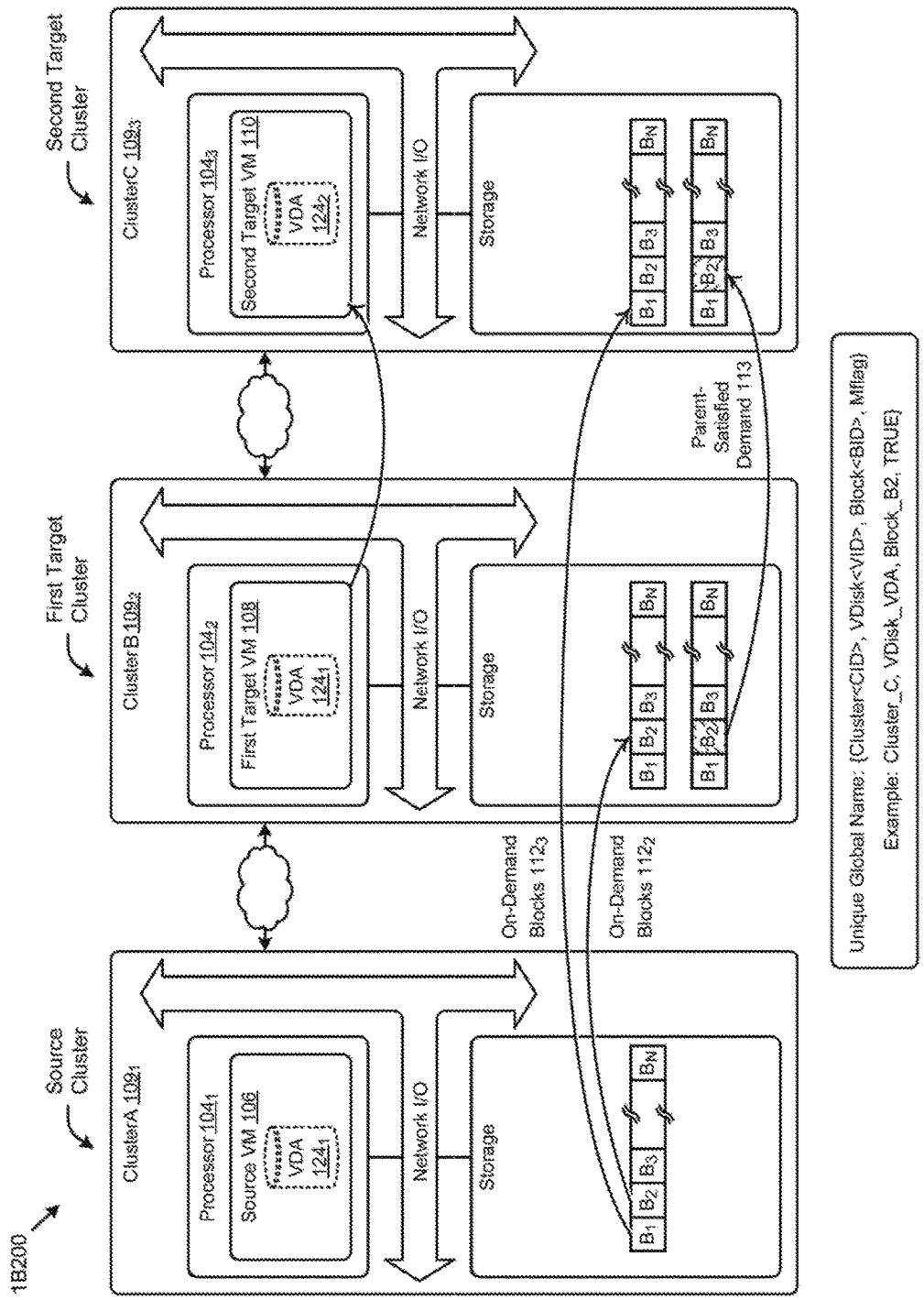
FIG. 1B2

VIRTUAL MACHINE BRING-UP WITH ON-DEMAND PROCESSING OF STORAGE REQUESTS

FIELD

This disclosure relates to cluster computing, and more particularly to techniques for inter-cluster virtual machine migration with on-demand processing of storage requests.

BACKGROUND

In an environment with multiple clusters (computing platforms) that host virtual machine (VMs), there are situations when a virtual machine and its functionality are moved from one cluster to another cluster. In many such environments, a subject virtual machine might need to be moved from its original cluster location to a new cluster location. In many cases, the functions provided by the subject virtual machine rely on stored data. One legacy approach for moving the functions of a VM is to move the VM's data (e.g., a file or set of blocks), and then start the virtual machine in the new cluster location.

Unfortunately, this legacy technique introduces unwanted latency and unwanted costs. For example, it may require a lot of elapsed time to move a file or set of blocks from the original cluster location to the new source location. Moreover, the act of moving the file or set of blocks from the original cluster location to the new source location might consume a significant amount of network bandwidth, which may have associated significant costs. In some cases (e.g., in enterprise situations) moving a file or set of blocks can consume many hours of elapsed time and many gigabytes or terabytes of data, thus introducing unacceptable latency before the subject virtual machine can serve its functions in the new cluster. Merely performing data compression only potentially ameliorates the problem.

Solving this problem demands a technique or techniques to move a virtual machine to a new cluster, and also move just enough of the files or sets of blocks so that the virtual machine can initiate operations even before the entirety of the file or set of blocks is moved (if ever) to the new cluster location. In some settings and/or in some applications, even though a particular corpus of data accessed by a virtual machine might comprise many gigabytes or terabytes of data, it sometime occurs that the virtual machine needs to access only a relatively small portion of the corpus to be fully functional. Especially in such cases, the legacy techniques are extremely wasteful.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for performing inter-cluster virtual machine migration. The disclosed techniques advance the relevant technologies to address technological issues with legacy approaches. More specifically, the present disclosure provides a detailed description of techniques used in systems, methods, and in computer program products for inter-cluster virtual machine migration with on-demand processing of storage requests. Certain embodiments are directed to technological solutions for performing inter-cluster virtual machine migration with storage asset metadata and then satisfying storage asset accesses on demand after the virtual machine gains access to the storage asset metadata, which embodiments advance the relevant technical fields as well as advancing peripheral technical fields.

The disclosed embodiments modify and improve over legacy approaches. In particular, the herein-disclosed techniques provide technical solutions that address the technical problems attendant to migration of a virtual machine on a new target computing hardware, where such a migration can be slow and expensive. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage and distributed computing.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 and FIG. 1A2 depict techniques for virtual machine migration with on-demand processing of storage requests, according to an embodiment.

FIG. 1B1 depicts an inter-cluster migration technique that exemplifies inter-cluster virtual machine migration with on-demand processing of storage requests, according to an embodiment.

FIG. 1B2 depicts a multiple-cluster migration technique that exemplifies inter-cluster virtual machine migration with on-demand processing of storage requests, according to an embodiment.

DETAILED DESCRIPTION

Figure 2A:
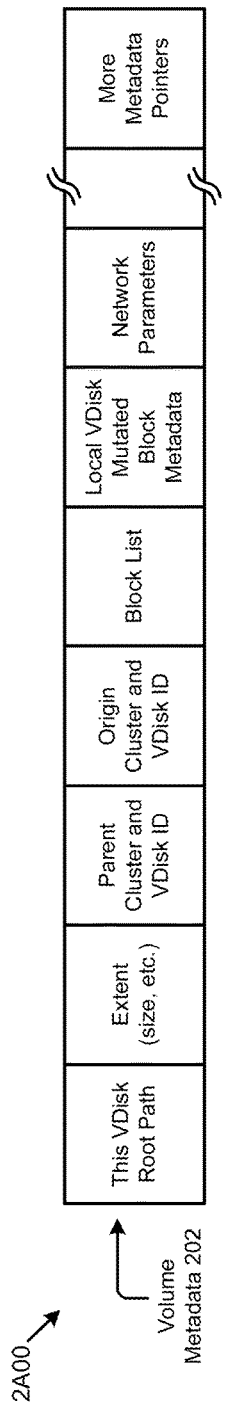
FIG. 2A depicts a data structure use model as used during virtual machine migration between clusters, according to an embodiment.

Some embodiments of the present disclosure address the problem of migration of a virtual machine (VM) onto a different target computing hardware, which, when using legacy techniques can be slow and expensive, especially when the virtual machine is not started until all of its storage assets are moved to the new location. Some embodiments are directed to approaches for performing inter-cluster virtual machine migration with storage asset metadata and satisfy storage asset accesses on demand after the virtual machine gains access to the storage asset metadata. More particularly, disclosed herein and in the accompanying figures are exemplary environments, systems, methods, and computer program products for inter-cluster virtual machine migration with on-demand processing of storage requests.

Overview

One technique to improve start-up latency and reduce costs when moving a virtual machine (VM) from one cluster to another cluster involves moving only a description (e.g., metadata) of the virtual disk (VDisk) or plurality of virtual disks that are reference by the VM, then starting the subject virtual machine at the new location. After the VM has mounted the virtual disk, storage asset demands are satisfied by moving only the files or blocks that are actually demanded by operation of the virtual machine. For example, a VM might process customer transactions for some enterprise, and the customer transaction database might be many terabytes in size. However, the transactions processed in any given timeframe (e.g., an hour or a day) might involve only a very small subset of the blocks of the transaction database. The needed (e.g., demanded) blocks corresponding to the particular customer for whom the transaction is being processed can be demanded, block-by-block as the transaction is processed. In some cases, a usage pattern (e.g., storage access pattern) by a subject virtual machine might have been tracked (e.g., while the subject virtual machine was operating at the original cluster), and tracked patterns can be captured in a history file and/or in volume metadata (e.g., as volume history). In some such cases, files or blocks or ranges of files or blocks that have been known to be in frequent access by the VM (e.g., while the subject virtual machine was operating at the original cluster) can be prospectively moved from the original cluster location to the new cluster location. The aforementioned technique can be used in a cloud-computing environment, for example when an enterprise predicts a period of high demand. A subject virtual machine (e.g., that processes order transactions) can be moved to a target cluster in a cloud platform, and the portion of the storage needed by the subject virtual machine can be moved to the cloud platform, either on-demand or prospectively.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A1 and FIG. 1A2 depict techniques for virtual machine migration with on-demand processing of storage requests.

The shown environment 1A100 includes a first computing platform $101_1$ and a second computing platform $101_2$. The platforms are interconnected by a network (e.g., a WAN, LAN, etc.) such that any portions of information stored in the first storage facility can be communicated to the second storage facility. In cases of moving a virtual machine (e.g., in a migration or cloning scenario), bootable portions, possibly including all or a portion of an operating system (OS) and OS configuration data (e.g., see boot portion $103_1$), can be transmitted over the network from the first storage facility of the first computing platform to the second storage facility (e.g., see operation 151). Additionally, metadata pertaining to any volumes (e.g., see volume "D:/") within the shown virtual disk can be moved from the first storage facility of the first computing platform to the second storage facility (e.g., see operation 152). When the moved virtual machine (see VM1 to VM2) comes-up (e.g., progresses through at least some portion of the boot sequence), the virtual machine VM2 can use the moved volume metadata (e.g., the volume metadata pertaining to volume "D:/") to mount the volume (e.g., see operation 153). The moved virtual machine VM2 continues to run, for example, running an application that references and/or modifies application data (see the shown "Application Data" within virtual disk VD1 and within virtual disk VD2). Such application data can be stored in any storage facilities as physically materialized data (e.g., see the depictions of "Other Data").

The aforementioned operating system (OS) may be all or a portion of an operating system's code (e.g., Windows, Linux, etc.) or can be composed of a few instructions used to locate a boot loader program, or can be composed of a few instructions used to identify OS data, which can in turn be used by the boot loader or by the OS or portions thereof. In some cases the aforementioned OS can be composed of a set of instructions needed for an application to operate within a particular environment.

Upon or after performing boot-up and/or boot-loading operations, processing by VM2 continues. As shown, the environment 1A100 depicts the virtual machine VM2 running based on executable instructions found in the boot portion $103_2$. During the course of continued execution by VM2, for example during processing of an application, the virtual machine VM2 might need to reference and/or modify the shown "other data", however at this point in the shown progression, the "other data" has not yet been populated into second storage facility.

FIG. 1A2 depicts an environment 1A200 in a state when the application that references and/or modifies the shown other data (e.g., a block or set of blocks) demands data that has been present in the first storage facility, but is not yet present at the second storage facility. The demanded blocks are requested (e.g., see operation 154) and retrieved from first storage facility $102_1$ and saved into the second storage facility $102_2$, whereupon it is used by the virtual machine VM2.

The aforementioned computing platform $101_1$ and second computing platform $101_2$ can each be implemented as a cluster. Such a configuration sometimes occurs when the computing platform is in a first geography (e.g., North America) and the second computing platform is in a second geography (e.g., Europe). Using the aforementioned on-demand population techniques, migration with low latency start-up can be accomplished successively using any number of clusters.

FIG. 1B1 depicts an inter-cluster migration technique 1B100 that exemplifies inter-cluster virtual machine migration with on-demand processing of storage requests. As an option, one or more variations of inter-cluster migration technique 1B100 or any aspect thereof may be implemented in the context of the architecture and functionality of the embodiments described herein. The inter-cluster migration technique 1B100 or any aspect thereof may be implemented in any environment.

As shown, a virtual disk (e.g., VDA $124_1$) is hosted within a processing node (see processor $104_1$) that communicate with each other over I/O (input/output or IO) communication that serves inter-processor communication for a first computing cluster. A source virtual machine (VM) runs on the processing asset(s) and accesses the shown virtual disk. During operation of the VM, a metadata map of the virtual disk is constructed and maintained. In many situations, the metadata captures aspects of the virtual disk in the form of a list of blocks (e.g., $B_1$, $B_2$, $B_3$, $B_N$). A separate instance of a virtual disk (e.g., VDA $124_2$) is shown as being hosted within another processing node (see processor $104_2$).

For various reasons, a source VM that accesses storage assets such as the shown virtual disk VDA might be subjected to a migration to a second computing platform having several processing assets, such as is shown within a target cluster (e.g., clusterB $109_2$). In this situation, the source VM can be migrated as follows:

Clone the metadata map to the target cluster (e.g., see metadata clone);

Move the virtual machine to the target cluster (as shown); and

Start up the target virtual machine.

The target virtual machine accesses the metadata map, which has enough information in it to permit the target virtual machine to mount the corresponding virtual disk; and Handle requests for data on an on-demand basis (as shown).

Certain aspects in some embodiments of the present application are related to material disclosed in U.S. patent application Ser. No. 14/985,360 titled, "NETWORK RECONFIGURATION IN HYPERVISOR-AGNOSTIC DISASTER RECOVERY SCENARIOS" filed on Dec. 30, 2015, the content of which is incorporated by reference in its entirety in this application.

Certain aspects in some embodiments of the present application are related to material disclosed in U.S. patent application Ser. No. 14/206,924 titled, "METHOD AND SYSTEM FOR IMPLEMENTING VIRTUAL MACHINE IMAGES" filed on Mar. 12, 2014, the content of which is incorporated by reference in its entirety in this application.

It should be noted that the virtual disk VDA is depicted as a logical construction in processor asset. The actual persistent storage is materialized as volumes in the materialized storage area, possibly as blocks of persistently-stored data. Some embodiments support read-only volumes, other embodiments support both read-only as well as read-write volumes. In situations where a subject virtual machine is moved from an original location to a new location, once the virtual machine movement is complete, then the underlying data can be written-to by the moved virtual machine, and can be stored locally at the new cluster (e.g., in the new cluster's instance of materialized storage). In some situations, such as in a temporary migration or roll-back situation, the data written at the target cluster location can be moved back to the original cluster location. In another situation, the new cluster itself may invoke movement of a VM to yet another new cluster. Such a process of rolling VM migrations with on demand storage can continue. Any block that is stored at any cluster has an associated pointer to the location of is parent block (see FIG. 6A and FIG. 6B).

The two-cluster environment of FIG. 1B1 can be extended to any number of clusters, and virtual machines can be migrated from a first cluster to a second cluster and to a third cluster and so on. The herein-disclosed embodiments show and describe how data in volumes can be mutated by any of the migrated virtual machines and at any moment in time; the current (e.g., most up-to-date) set of blocks of the volume can be reconstructed at any cluster. The following FIG. 1B2 depicts a multiple-cluster migration technique.

FIG. 1B2 depicts a multiple-cluster migration technique 1B200 that exemplifies inter-cluster virtual machine migration with on-demand processing of storage requests. As an option, one or more variations of multiple-cluster migration technique 1B200 or any aspect thereof may be implemented in the context of the architecture and functionality of the embodiments described herein. The multiple-cluster migration technique 1B200 or any aspect thereof may be implemented in any environment.

Portions of storage assets (e.g., snapshots) belonging to migrated VMs can be distributed across multiple sites as well as across cloud service providers.

Strictly as an example, FIG. 1B200 depicts three computing clusters, shown as clusterA $109_1$, clusterB $109_2$, and clusterC $109_3$. Each cluster has its own respective set of processing assets (e.g., processor $104_1$, processor $104_2$, processor $104_3$), as well as a respective facility for materialized storage. As shown, ClusterA has an instance of a source VM 106 that has an associated virtual disk VDA $124_1$, ClusterB has an instance of a first target VM 108 that has a cloned instance of associated virtual disk VDA $124_2$ and ClusterC has a second target VM 110 as well as a further instance of associated virtual disk VDA $124_3$. A block from materialized storage on ClusterA can be accessed by either the first target VM at a first time or by the second target VM at a second time. In the former case, ClusterB accesses block B2, and ClusterC accesses block B1. Such blocks are retrieved by ClusterB and ClusterC on demand by their respective VMs (see on-demand blocks $112_2$ and on-demand blocks $112_3$). Further any VM can write to any block. If and when another cluster demands access to a written-to block, the then-current block can be retrieved from a parent cluster (e.g., see parent-satisfied demand 113). This scenario supports ongoing migration of a particular VM from one cluster to another cluster through any number of migrations.

Various aspects of a block can be stored persistently. In the example shown, a block can be uniquely identified using a unique global name that is formed of a combination of a cluster ID, and/or a virtual disk ID, and/or a block ID. For determining if a block is to be retrieved from a first-level parent cluster, or from another cluster, a modified flag can be included in the unique global name. As an example, and as shown, if ClusterC demands block B2 and the modified flag (e.g., Mflag) is set, then retrieval is attempted from ClusterB. If the modified flag were not set, then retrieval is attempted from the originating ClusterA.

Multiple applications can be serviced using these techniques. Strictly as examples, the techniques can be used for:
File-level restore operations: The user might want to access just a single file from the snapshot of a virtual disk. The user need not be required to retrieve the entire snapshot.
Support of virtual machine migration across clusters, and in a continuous fashion.
Image catalog distribution in remote-office/branch-office (ROBO) applications.
Other applications.

Start-up-up latency and reduction of costs can be still further improved. Strictly as one stepwise embodiment, at the point of a migration event, a set of operations are performed to:
Analyze and capture the blocks on the disk which contain relevant metadata of the file system on the disk in the snapshot;
Capture relevant metadata (e.g., virtual disk structure, virtual disk content directory, file system information, etc.); and
Upon a migration event to a remote site, the relevant metadata is communicated to the remote site for access by the migrated VM.

Upon access by a migrated VM (e.g., from the remote site):
The VM accesses the virtual disk metadata. The relevant metadata that was communicated to the remote site is sufficient for the VM to mount the disk and perform many catalog-related operations (e.g., to browse the storage assets mentioned in the metadata).
As needed (if ever), the VM requests access to particular blocks in the virtual disk. If data corresponding to those block are not present at the remote site, then forward the request to the source site and retrieve just the demanded blocks. Such demanded blocks are retrieved by the remote site and written locally at the remote site so as to be available for servicing future access requests.
Data in blocks that are mutated by the VM at the remote site are marked as being mutated.

As aforementioned, many applications can be serviced using techniques to retrieve just portions of a very large directory. Various forms of the herein-described metadata can serve for accessing only a portion of a very large directory such that the directory can be browsed before any contents are actually transmitted over the WAN or other network. One possible organization of such metadata into a data structure is given in the following FIG. 2A. Further, such a data structure can be used to codify metadata for storage objects, including metadata for volumes and/or metadata for snapshots as given in the following FIG. 2B.

FIG. 2A depicts a data structure use model 2A00 as used during virtual machine migration between clusters. As an option, one or more variations of data structure use model 2A00 or any aspect thereof may be implemented in the context of the architecture and functionality of the embodiments described herein. The data structure use model 2A00 or any aspect thereof may be implemented in any environment.

As shown, the data structure shown as volume metadata 202 comprises a path, an extent, a parent cluster ID, an origin cluster ID, a block list, a mutated block list and its respective additional metadata pointers, network parameters (e.g., speed, etc.). A volume metadata record can hold additional metadata and/or additional pointers to other metadata pertaining to the volume or any snapshots of the volume. As one specific example, the volume metadata might comprise history and/or access patterns that can be used in determining a set of blocks to prospectively prefetch so as to locate such hot blocks on the target clone of the volume.

Figure 2B:
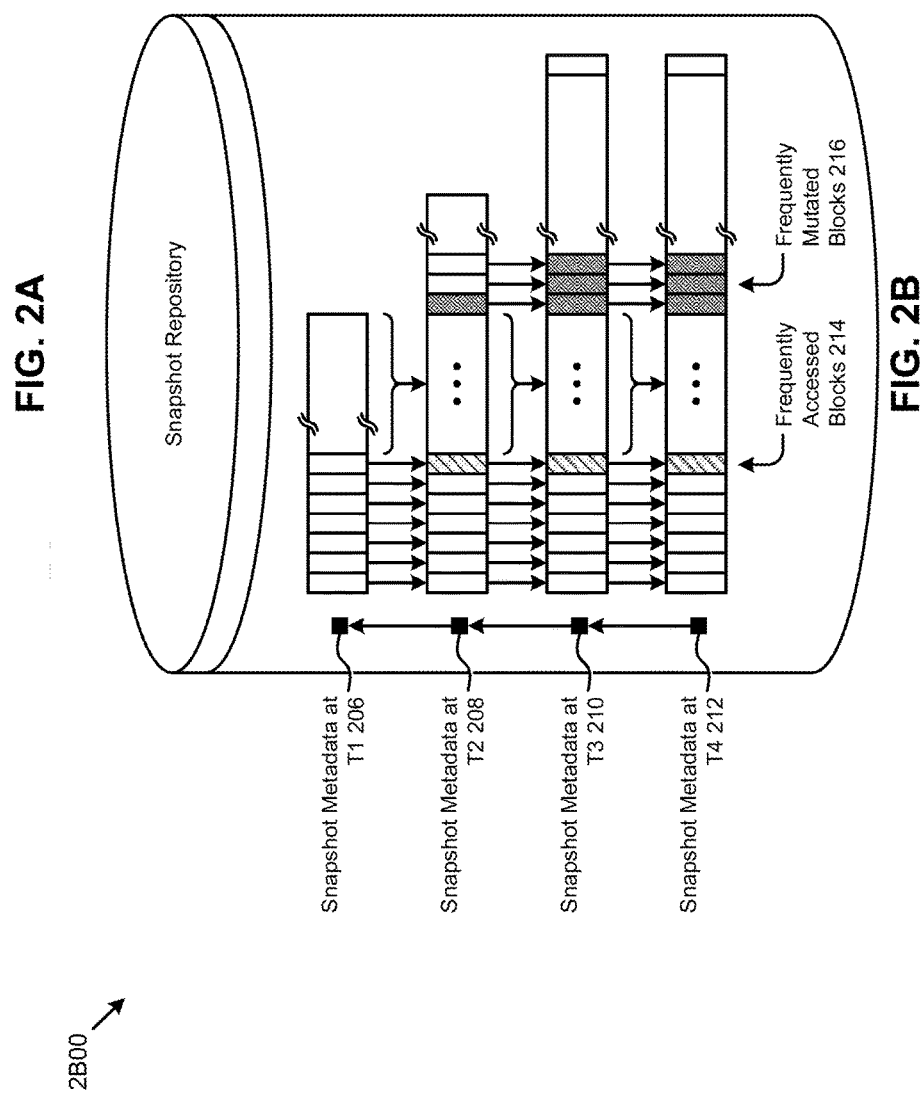
FIG. 2B depicts a series of transformations of an example instance of volume metadata, according to an embodiment.

FIG. 2B depicts a series of transformations 2B00 of an example instance of volume metadata 202.

As shown, the metadata follows construction of a snapshot over time. The volume metadata begins as comprising a list of blocks (see snapshot metadata at T1 206). As a block within the volume is modified (e.g., by deletion of a block or blocks), and/or as the volume is extended and/or accessed, the metadata is so annotated (see snapshot metadata at T2 208). As further accesses (e.g., READ or WRITE operations) are made to the volume, the accesses are recorded and marked (see snapshot metadata at T3 210 and snapshot metadata at T4 212). Such monitoring can be performed continuously throughout the lifetime of a volume. Accordingly, blocks that are frequently subject to a READ operation (e.g., see frequently access blocks 214) and blocks that are frequently subjected to a WRITE operation (e.g., see frequently mutated blocks 216) are marked in the metadata, as shown. Aggregate usage patterns of blocks within a volume can be captured at any moment in time and any technique might be used to identify frequently access blocks 214 and/or frequently mutated blocks 216. More particularly, usage patterns of blocks can be captured by any module that is in-line with or adjacent to the flow of storage I/O.

Figure 3A:
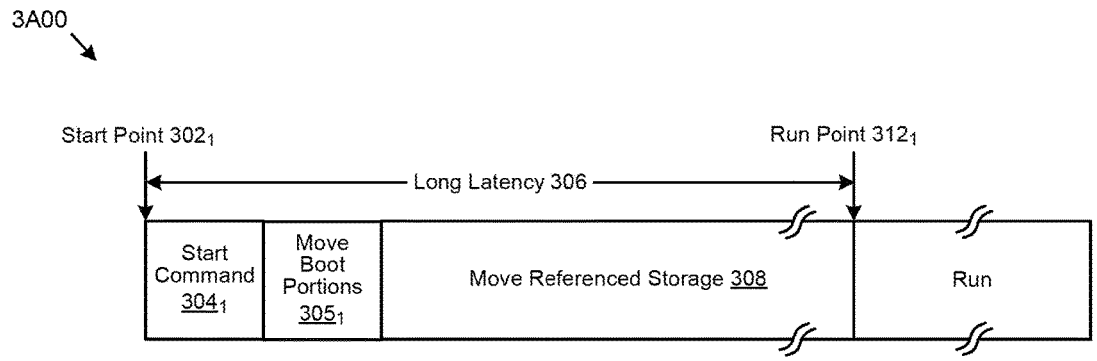
FIG. 3A and FIG. 3B depict a latency comparison showing improved latency, according to some embodiments.
Figure 3B:
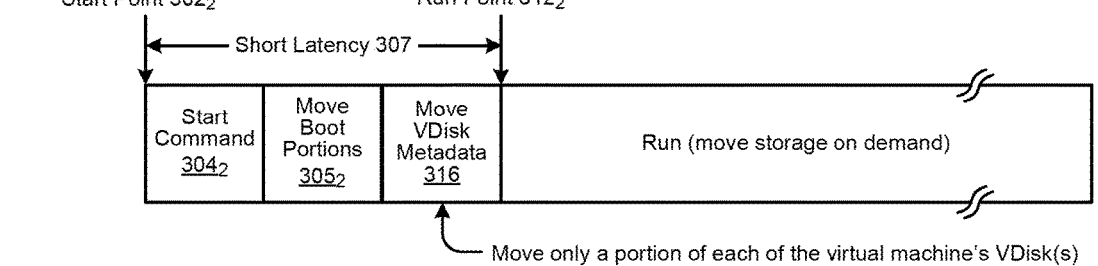
Figure 3C:
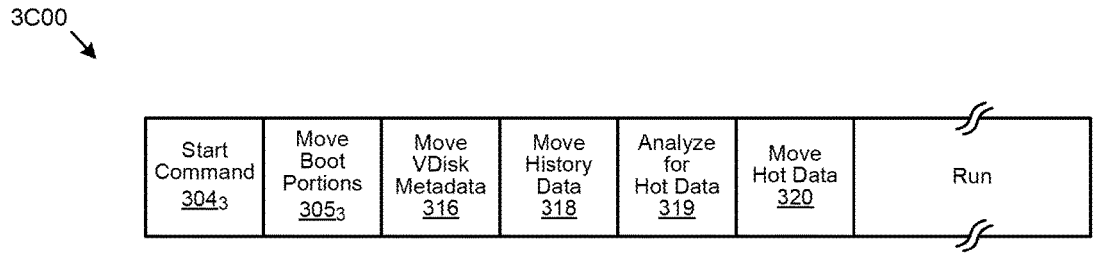
FIG. 3C depicts a hot data analysis flow as used in inter-cluster virtual machine migration with on-demand processing of storage requests, according to some embodiments.

Techniques to reduce start-up latency as measured by migrated virtual machine start-up time is further discussed as pertaining to the following FIG. 3A, FIG. 3B, and FIG. 3C.

FIG. 3A and FIG. 3B depict a latency comparison between flow 3A00 and flow 3B00 showing improved latency.

The long latency 306 as shown in FIG. 3A is presented for comparison to the short latency 307 of FIG. 3B. The sequences of FIG. 3A and FIG. 3B each begin at a start point (e.g., start point $302_1$ and start point $302_2$), and proceed to a run point (e.g., see run point $312_1$ and run point $312_2$). As shown, the short latency 307 is significantly shorter than the long latency 306. In this example, the long latency 306 is substantially attributable to the operation to move reference storage 308. This operation is eliminated or minimized through using the herein-described techniques. Strictly for comparison, both sequences are invoked upon processing of a VM migration start command (e.g., start command $304_1$ and start command $304_2$). In the long latency scenario of FIG. 3A, the boot portions (see move boot portions $305_1$) are moved, and then the next operation is to move the storage that is referenced by the migrated VM. In some cases, the referenced storage is very large, possibly gigabytes or terabytes, and movement of the referenced storage in its entirety can consume a great deal of resources, including time (e.g., latency), memory, computing power, as well as a great deal of network bandwidth, possibly at a significant expense. The techniques described herein can be employed to avoid movement of the referenced storage in its entirety when a VM is migrated.

As shown in FIG. 3B, rather than movement of the referenced storage in its entirety, only some of the boot portions (see move boot portions $305_2$) and shells (e.g., metadata) of other storage assets are moved. The shell (e.g., metadata of a volume) is sufficient for the migrated VM to mount the corresponding storage asset.

The shortened latency (e.g. short latency 307) and improved runtime performance can be still further improved by managing "hot data". One possible flow for managing hot data (e.g., hot blocks) is shown and discussed as pertains to the following FIG. 3C.

FIG. 3C depicts a hot data analysis flow 3C00 as used in inter-cluster virtual machine migration with on-demand processing of storage requests. As an option, one or more variations of hot data analysis flow 3C00 or any aspect thereof may be implemented in the context of the architecture and functionality of the embodiments described herein.

The hot data analysis flow 3C00 or any aspect thereof may be implemented in any environment.

The embodiment shown in FIG. 3C is merely one example. The flow is invoked upon receipt of a start command $304_3$ that begins the VM migration. Next, some or all of the boot portions (see move boot portions $305_3$) are moved, and then volume metadata is moved (e.g., see move virtual disk metadata 316). To facilitate hot block retrieval, history data (e.g., see move history data 318) is moved. In some cases, the history had been pre-analyzed, and hot blocks are listed in the metadata. In other situations, the history data can be analyzed by a storage controller hosted on the target cluster (e.g., after the migrated virtual machine has mounted its virtual disk) to determine frequently accessed (e.g., READ or WRITE) blocks (e.g., see operation to analyze for hot data 319). Portions of the hot data (e.g., the hottest data within a bound) can be prefetched (e.g., see operation to move hot data 320) on behalf of the migrated virtual machine—even before the migrated virtual machine has made any demand for the corresponding hot data.

Figure 4A:
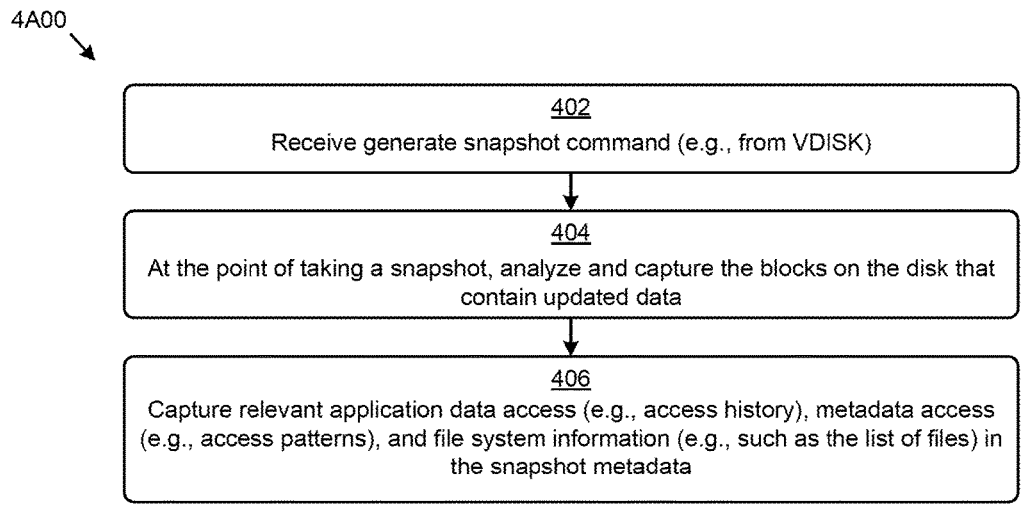
FIG. 4A depicts a virtual disk metadata construction flow as used in inter-cluster virtual machine migration with on-demand processing of storage requests, according to some embodiments.
Figure 4B:
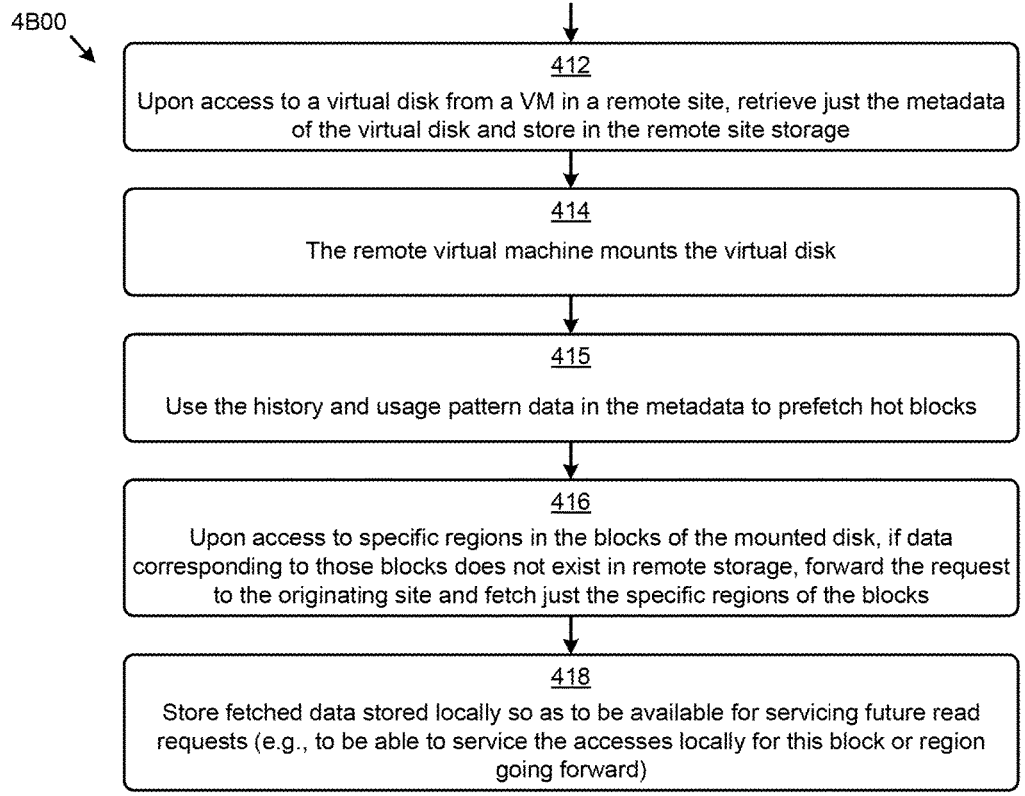
FIG. 4B depicts a virtual disk metadata usage flow as used in inter-cluster virtual machine migration with on-demand processing of storage requests, according to some embodiments.

As heretofore described, the volume metadata can be constructed continuously. FIG. 4A and FIG. 4B depict construction and usage flows.

FIG. 4A depicts a virtual disk metadata construction flow 4A00 as used in inter-cluster virtual machine migration with on-demand processing of storage requests. As an option, one or more variations of virtual disk metadata construction flow 4A00 or any aspect thereof may be implemented in the context of the architecture and functionality of the embodiments described herein. The virtual disk metadata construction flow 4A00 or any aspect thereof may be implemented in any environment.

On an ongoing basis, a virtual machine (e.g., see controller virtual machine in FIG. 8A) can receive a command to generate a virtual disk (see step 402), such that ongoing monitoring operations can commence. For example, ongoing operations for generating snapshots of the volume can be initiated. At any moment in time, an access can be made to the volume (e.g., a READ operation or a WRITE operation) and such an access can be recorded. Any WRITE operation is noted such that that block would be at least a candidate to be included in a subsequent snapshot. At the point of taking a snapshot (see step 404) a process can coalesce relevant access data (e.g., access history), metadata (e.g., access patterns), and file system information (e.g., such as the list of files) into snapshot metadata (see step 406). This can be used by a migrated VM such as is described in the following usage flow.

FIG. 4B depicts a virtual disk metadata usage flow 4B00 as used in inter-cluster virtual machine migration with on-demand processing of storage requests. As an option, one or more variations of virtual disk metadata usage flow 4B00 or any aspect thereof may be implemented in the context of the architecture and functionality of the embodiments described herein. The virtual disk metadata usage flow 4B00 or any aspect thereof may be implemented in any environment.

The shown flow depicts operations taken by a migrated virtual machine at a remote site. The migrated virtual machine is started on the remote site cluster and then retrieves the metadata of the snapshot pertaining to a storage asset (see step 412). The VM mounts the volume using the retrieved snapshot metadata (see step 414). The history and usage pattern in the metadata are accessed (see step 415), and hot blocks are prefetched prospectively (see FIG. 5).

Figure 5:
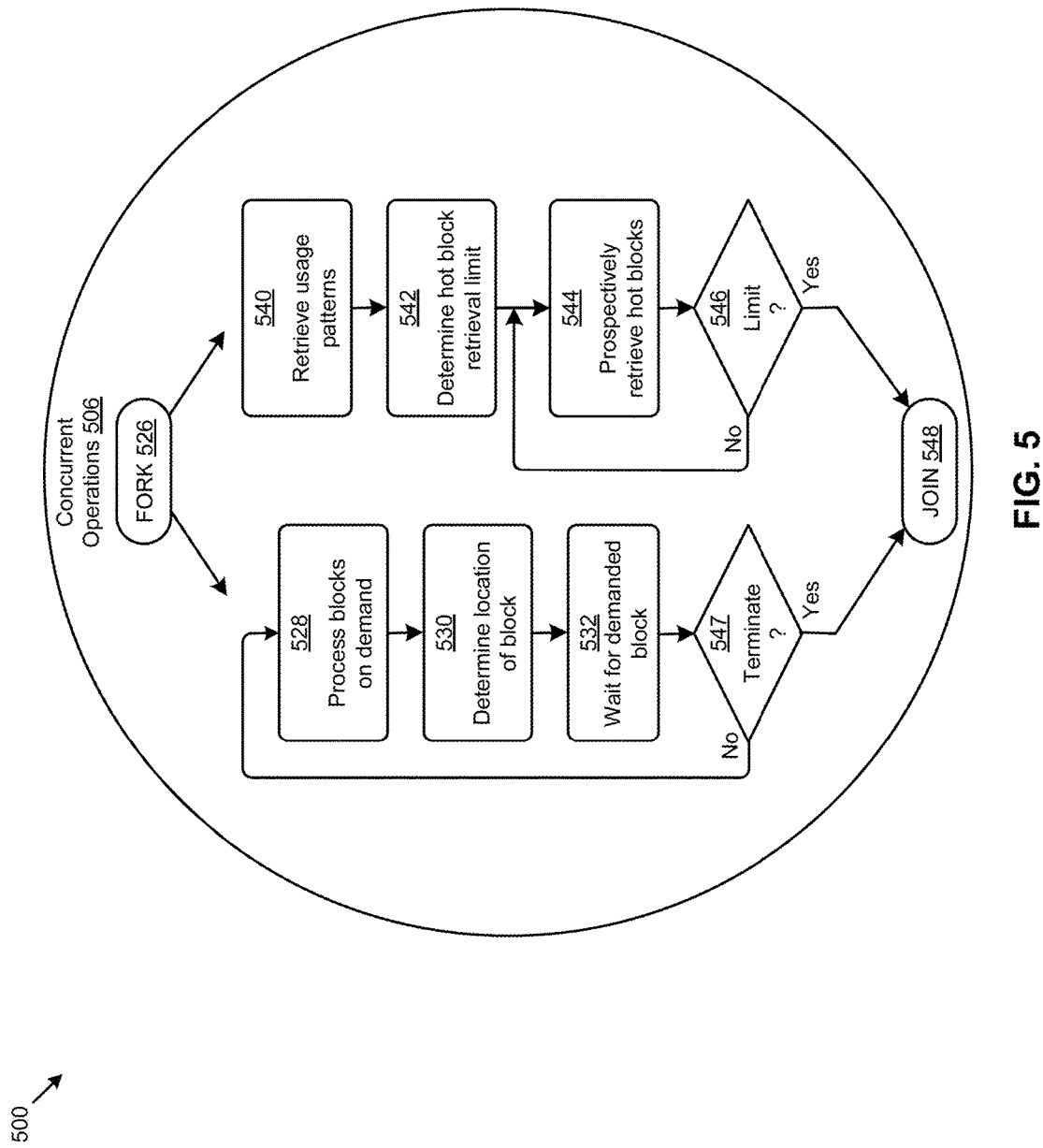
FIG. 5 depicts a fork-join flow as used in inter-cluster virtual machine migration with on-demand processing of storage requests, according to some embodiments.

Upon the migrated VM's access to specific regions in the blocks of the mounted disk, if data corresponding to those blocks exist at the remote site (e.g., by virtue of the prospectively prefetched blocks), that local data is used by the VM. If the data corresponding to those blocks does not exist at the remote site, then the request is forwarded to the remote site to fetch just the specific regions of the blocks (see step 416). The retrieved data is stored locally at the remote site such that further accesses are made from the local copy (see step 418). The prospective prefetch operation can be performed in parallel with VM application operations. FIG. 5 depicts one technique for parallelizing the two sets of operations.

FIG. 5 depicts a fork-join flow 500 as used in inter-cluster virtual machine migration with on-demand processing of storage requests.

The shown concurrent operations 506 include two flows that operate in parallel upon a fork operation (see fork 526). In one flow (see right side of FIG. 5) the usage patterns are retrieved (see operation 540), and any limit on hot block retrieval is determined (see operation 542). A set of hot blocks are prospectively retrieved (see operation 544) up to the determined limit (see decision 546). When the limit is reached, the path ends (see join 548). Concurrent with these flows is the application-centric progression of the migrated VM. Specifically, blocks are accessed on demand (see operation 528). A local function determines if the demanded block is stored locally (see operation 530) or if the demanded block is stored at another site. In both cases the demanded block is retrieved (see operation 532). This process continues until terminated (see decision 547). As can be seen, the prospective population of hot blocks can reduce the likelihood that a demanded block (see operation 528) would trigger a retrieval from another site.

Figure 6A:
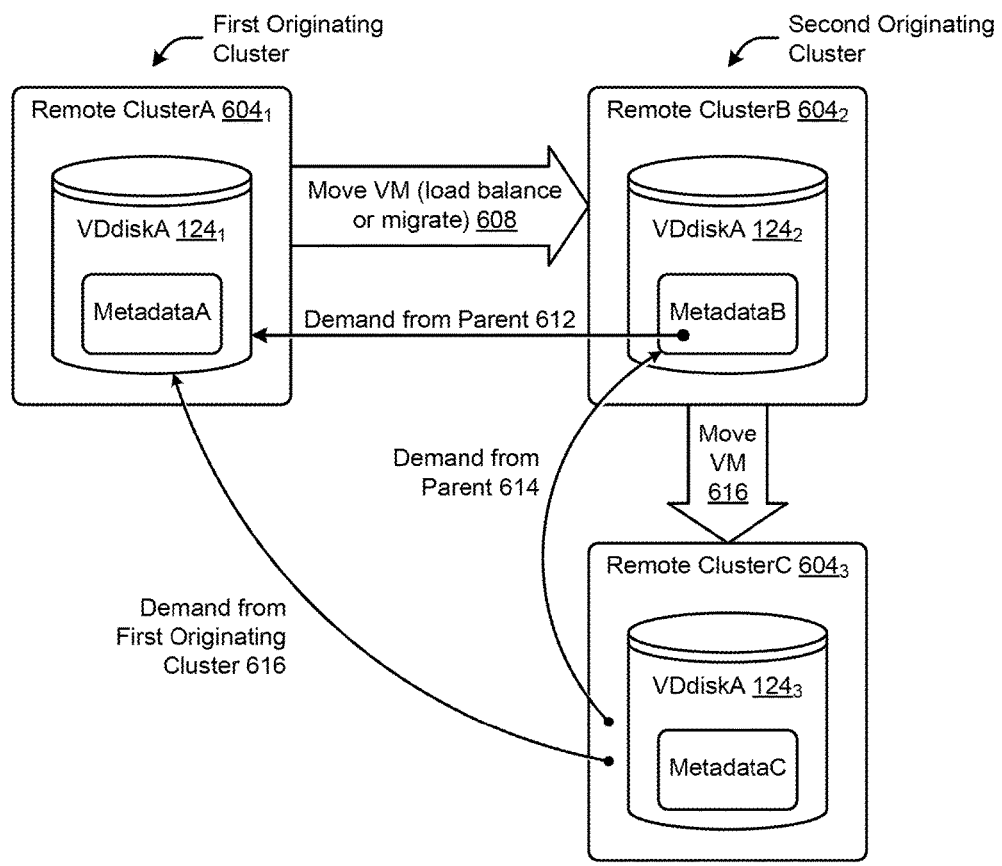
FIG. 6A and FIG. 6B depict a multi-cluster migration flow as used for virtual machine migration with on-demand processing of storage requests, according to some embodiments.
Figure 6B:
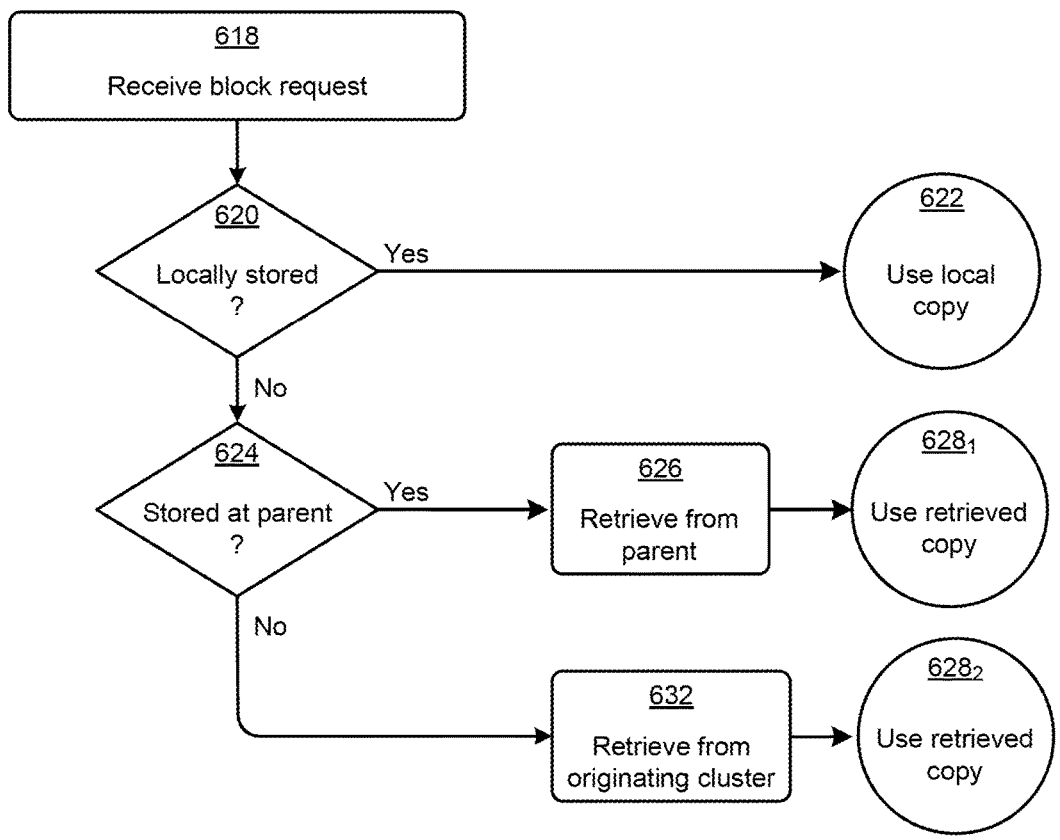

FIG. 6A and FIG. 6B depict a multi-cluster migration environment 6A00 and a multi-cluster block demand sequencing flow 6B00 as used for virtual machine migration with on-demand processing of storage requests.

As shown in FIG. 6A, a particular virtual machine might be moved from cluster to cluster so as to implement load balancing or migration procedures. The figure depicts a first originating cluster (e.g., remote clusterA $604_1$) a second originating cluster (e.g., remote cluster $604_2$), and a third cluster (e.g., remote cluster $604_3$). This environment occurs in many load balancing or migration situations. More particularly, a VM that accesses virtual disk VDiskA might be moved to another cluster (see operation 608) and continue operations. Such operations might involve writing of blocks, and such WRITE operations would be recorded in metadataB. As earlier described, if a block is demanded from a migrated VM, it requests a copy of the block from the originating server (e.g., see demand from parent 612).

In some situations a migrated VM is again migrated to yet another, third cluster. In such a case, the VM at the third cluster will use the volume metadata 202—specifically the mutated block list and its respective additional metadata pointers—so as to determine the location of the most-currently-mutated block. If the block was mutated by the immediate parent, the most-currently-mutated block will be from the immediate parent (see demand from parent 614). Otherwise, the demanded block was not mutated by the immediate parent, so the demanded block is retrieved from the first originating cluster (see demand from first originating cluster 616). This pattern of migrating a VM and its local copy of metadata can continue through any number of migrations.

FIG. 6B depicts a multi-cluster block demand sequencing flow 6B00 that can be used regardless of the number of migrations.

As shown in FIG. 6B, the multi-cluster block demand sequencing flow 6B00 receives a block request (see operation 618) and determines if the demanded block is already locally stored (e.g., due to prospective prefetching, or due to satisfaction of a previous demand). If the block is local (see decision 620), the local copy is used (see resolution 622). If the local metadata indicates that the demanded block has been mutated, then it is stored at its immediate parent. If so, then the determination (see decision 624) invokes operations to retrieve from the immediate parent (see operation 626), and the retrieved copy is used to satisfy the demand (see resolution $628_1$). If the local metadata indicates that the demanded block has not been mutated, then it is stored at the originating cluster. If so, then the flow invokes operations to retrieve from the originating cluster (see operation 632), and the retrieved copy is used to satisfy the demand (see resolution $628_2$).

ADDITIONAL EMBODIMENTS OF THE DISCLOSURE

Additional Practical Application Examples

Figure 7:
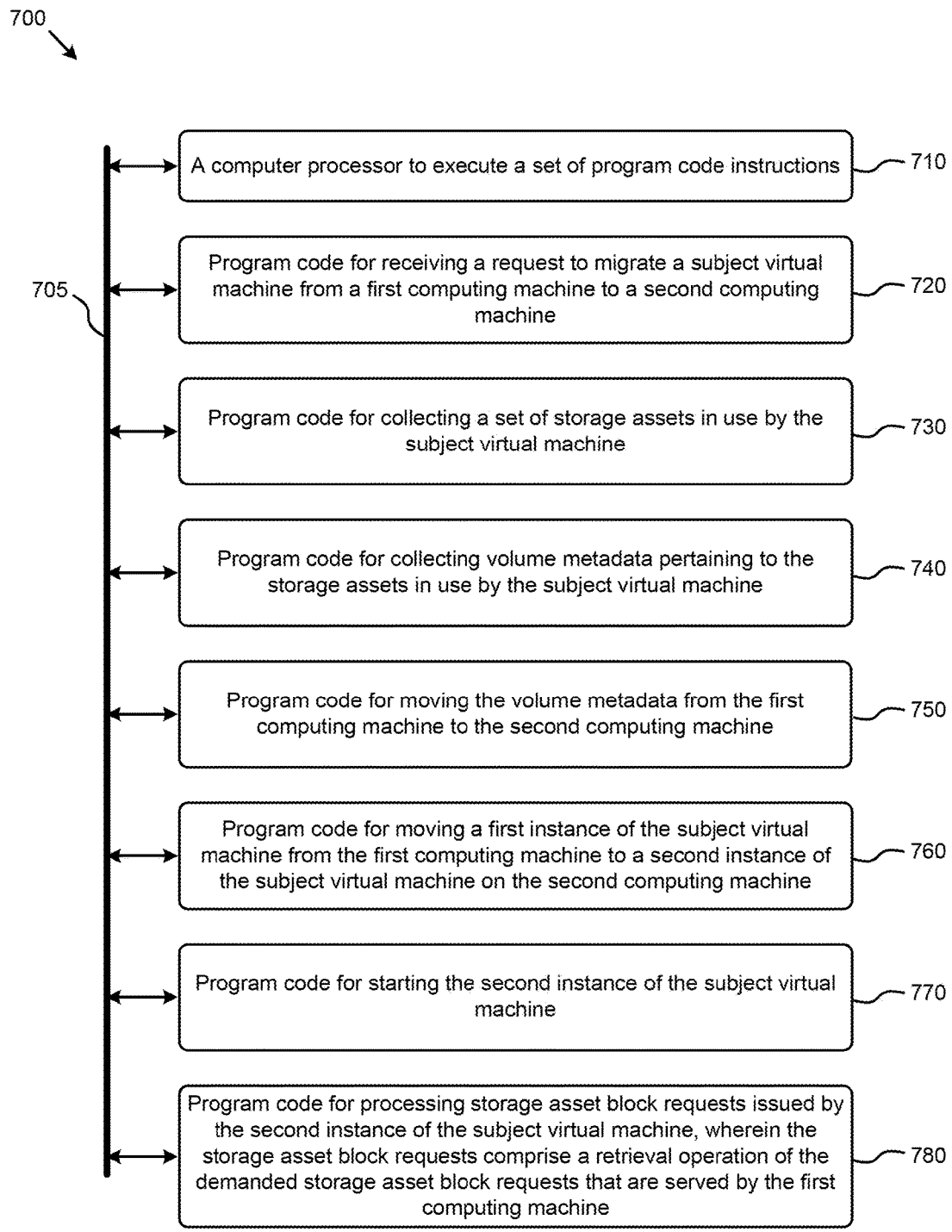
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising a computer processor to execute a set of program code instructions (see module 710) and modules for accessing memory to hold program code instructions to perform: receiving a request to migrate a subject virtual machine from a first computing machine to a second computing machine (see module 720); collecting a set of storage assets in use by the subject virtual machine (see module 730); collecting volume metadata pertaining to the storage assets in use by the subject virtual machine (see module 740); moving the volume metadata from the first computing machine to the second computing machine (see module 750); moving a first instance of the subject virtual machine from the first computing machine to a second instance of the subject virtual machine on the second computing machine (see module 760); starting the second instance of the subject virtual machine (see module 770); and processing storage asset block requests issued by the second instance of the subject virtual machine, wherein the storage asset block requests comprise a retrieval operation of the demanded storage asset block requests that are served by the first computing machine (see module 780).

Variations of the foregoing may include more or fewer of the foregoing modules and variations may perform more or fewer (or different) steps, and may use data elements in more or fewer (or different) operations.

System Architecture Overview

Additional System Architecture Examples

Figure 8A:
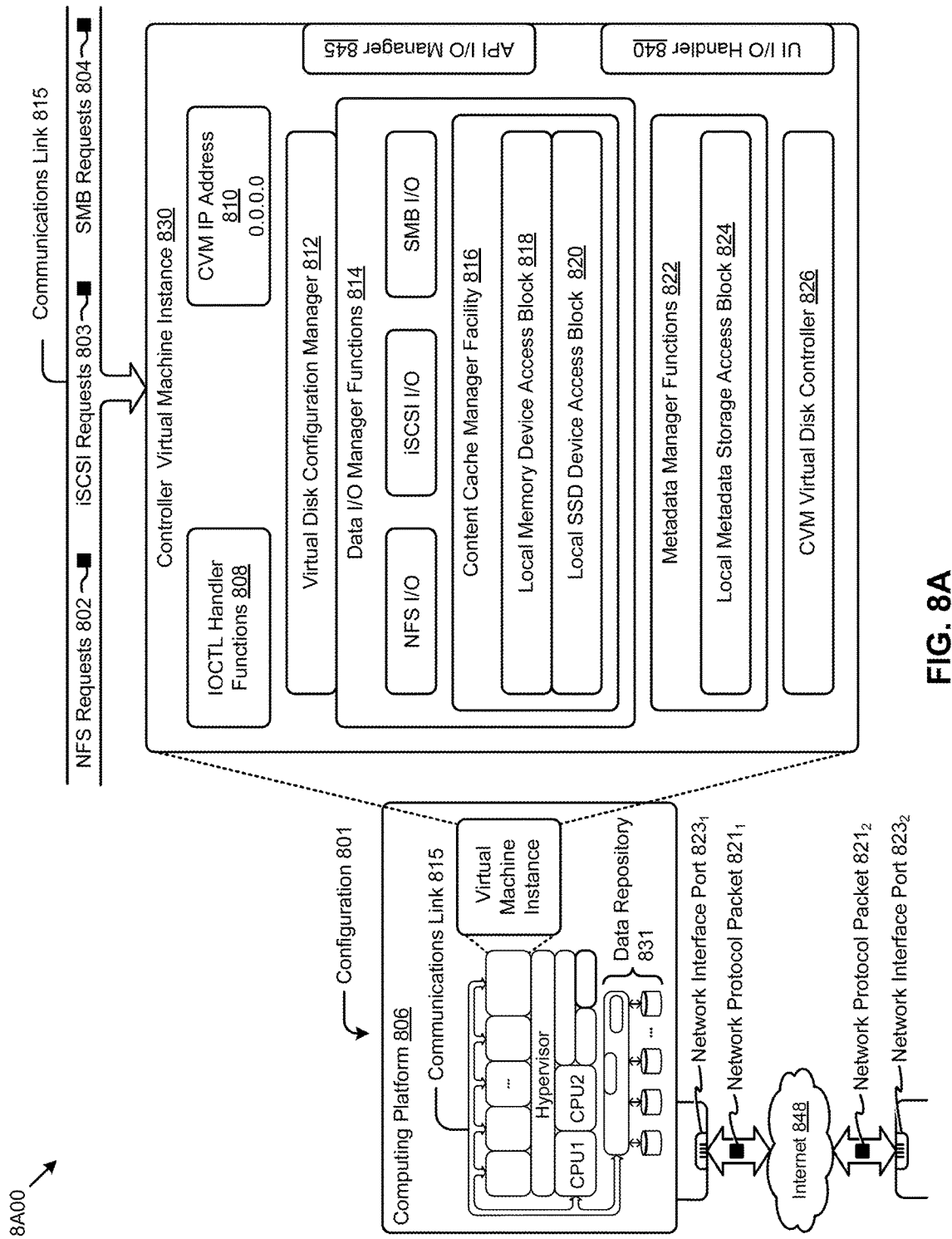
FIG. 8A and FIG. 8B depict architectures comprising collections of interconnected components suitable for implementing embodiments of the present disclosure and/or for use in the herein-described environments.

FIG. 8A depicts a virtual machine architecture 8A00 comprising a collection of interconnected components suitable for implementing embodiments of the present disclosure and/or for use in the herein-described environments. The shown virtual machine architecture 8A00 includes a virtual machine instance in a configuration 801 that is further described as pertaining to the controller virtual machine instance 830. A controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system requests (SMB) in the form of SMB requests 804. The controller virtual machine instance publishes and responds to an internet protocol (IP) address (e.g., see CVM IP address 810. Various forms of input and output (I/O or IO) can be handled by one or more IO control handler functions (see IOCTL functions 808) that interface to other functions such as data IO manager functions 814, and/or metadata manager functions 822. As shown, the data IO manager functions can include communication with a virtual disk configuration manager 812, and/or can include direct or indirect communication with any of various block IO functions (e.g., NFS IO, iSCSI IO, SMB IO, etc.).

In addition to block IO functions, the configuration 801 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

The communications link 815 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes any non-volatile storage medium, for example, solid state storage devices (SSD), or optical or magnetic disks such as disk drives or tape drives. Volatile media includes dynamic memory such as a random access memory. As shown, the controller virtual machine instance 830 includes a content cache manager facility 816 that accesses storage locations, possibly including local DRAM (e.g., through the local memory device access block 818) and/or possibly including accesses to local solid state storage (e.g., through local SSD device access block 820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831, can be configured using a CVM virtual disk controller 826, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 801 can be coupled by a communications link 815 (e.g., backplane, LAN, PTSN, wired or wireless network, etc.) and each instance may perform respective portions of sequences of instructions as may be required to practice embodiments of the disclosure The shown computing platform 806 is interconnected to the Internet 848 through one or more network interface ports (e.g., network interface port $823_1$ and network interface port $823_2$). The configuration 801 can be addressed through one or more network interface ports using an IP address. Any operational element within computing platform 806 can perform sending and receiving operations using any of a range of network protocols, possibly including network protocols that send and receive packets (e.g., see network protocol packet $821_1$ and network protocol packet $821_2$).

The computing platform 806 may transmit and receive messages that can be composed of configuration data, and/or any other forms of data and/or instructions organized into a data structure (e.g., communications packets). In some cases, the data structure includes program code instructions (e.g., application code), communicated through Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of inter-cluster virtual machine migration with on-demand processing of storage requests.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of inter-cluster virtual machine migration with on-demand processing of storage requests). Such files or records can be brought into and/or stored in volatile or non-volatile memory.

Figure 8B:
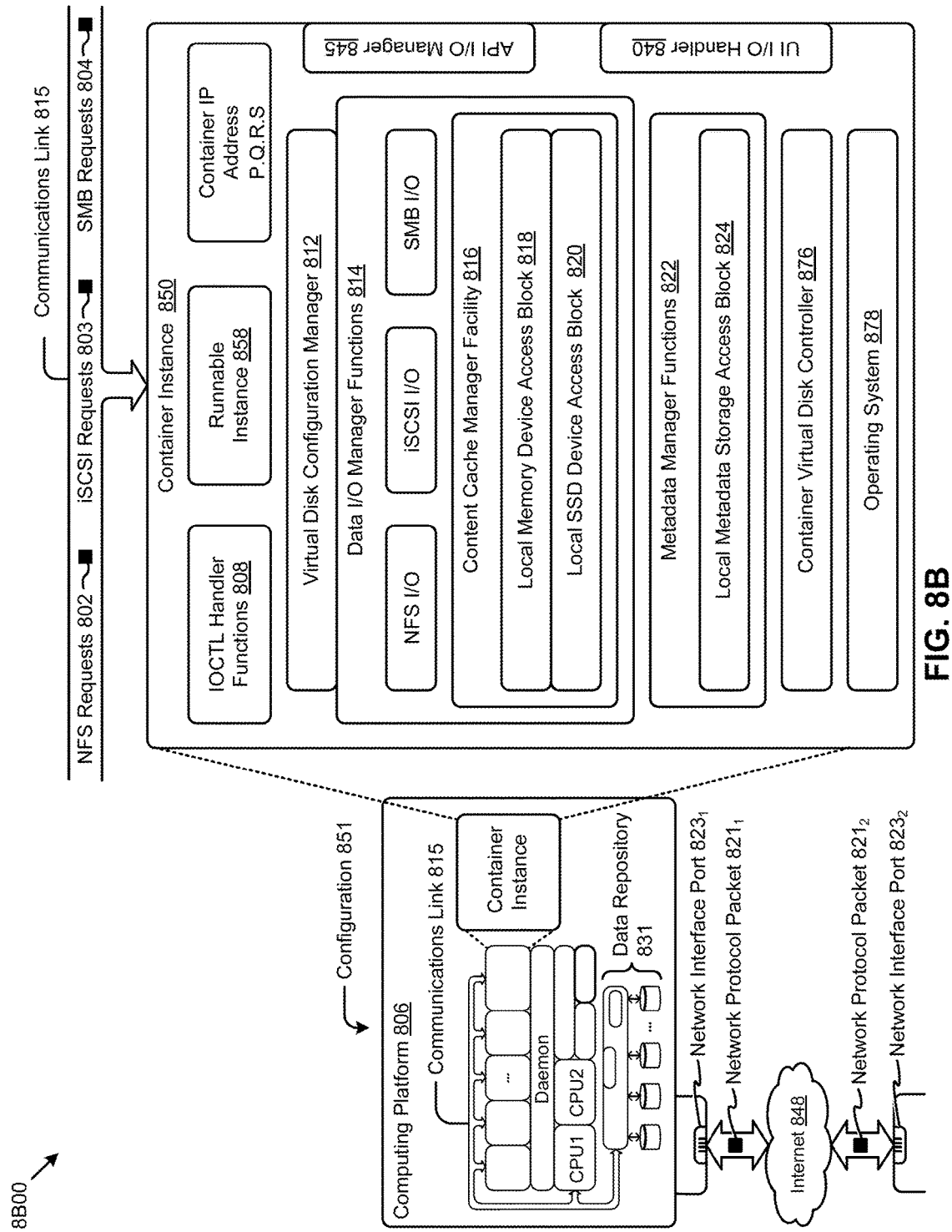

FIG. 8B depicts a containerized architecture 8B00 comprising a collection of interconnected components suitable for implementing embodiments of the present disclosure and/or for use in the herein-described environments. The shown containerized architecture 8B00 includes a container instance in a configuration 851 that is further described as pertaining to the container instance 850. The configuration 851 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls -a", etc.). The container might optionally include an operating system 878, however such an operating system need not be provided. Instead, a container can include a runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 876. Such a container virtual disk controller can perform any of the functions that the aforementioned CVM virtual disk controller 826, yet such a container virtual disk controller does not rely on a hypervisor or any particular operating system so as to perform its range of functions.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
receiving a request to move a subject virtual machine from a first computing machine to a migrated virtual machine on a second computing machine;
determining a set of storage assets within a virtual disk that are accessible by the subject virtual machine, the virtual disk comprising a first portion and a second portion, the first portion corresponding to a bootable portion of an operating system and a second portion corresponding to a mountable volume;
determining volume metadata pertaining to the second portion of the virtual disk of the subject virtual machine, the volume metadata corresponding to a metadata map of the mountable volume within the virtual disk;
moving at least some of the first portion corresponding to a bootable portion of the virtual disk to the second computing machine;
moving the volume metadata pertaining to the second portion of the virtual disk from the first computing machine to the second computing machine;
starting the migrated virtual machine on the second computing machine by performing a boot sequence, the boot sequence comprising execution of at least some of the bootable portion of the virtual disk;
mounting the mountable volume on the second computing machine without moving the virtual disk in its entirety, wherein the mountable volume is mounted by accessing the volume metadata that was moved from the first computing machine to the second computing machine; and
processing storage asset block requests corresponding to the mountable volume that are issued by the migrated virtual machine, wherein the storage asset block requests comprise a retrieval operation for one or more storage asset blocks within the mountable volume that are served by the first computing machine.

2. The method of claim 1, further comprising performing, by the second computing machine, a set of pre-fetch operations to prospectively retrieve hot blocks.

3. The method of claim 1, wherein the volume metadata comprises at least one of, a parent indication, or a modified flag, or a path, or an extent, or a parent cluster ID, or an origin cluster ID, or a block list, or a mutated block list, or any combination thereto.

4. The method of claim 1, wherein the volume metadata comprises at least one of, a volume history, or a hot block list, or any combination thereto.

5. The method of claim 4, further comprising analyzing the volume history to determine frequently accessed blocks.

6. The method of claim 4, further comprising analyzing the hot block list to determine frequently mutated blocks.

7. The method of claim 6, further comprising performing, by the second computing machine, a set of pre-fetch operations to prospectively retrieve blocks from the hot block list.

8. The method of claim 1, further comprising moving the volume metadata from the second computing machine to a third computing machine.

9. The method of claim 8, further comprising performing, by the third computing machine, retrieval of a set of pre-fetch operations to prospectively retrieve hot blocks.

10. The method of claim 1, further comprising performing, by the second computing machine, retrieval of portions of OS configuration data.

11. A computer readable medium, embodied in a non-transitory computer readable medium, the non-transitory computer readable medium having stored thereon a sequence of instructions which, when stored in memory and executed by a processor causes the processor to perform a set of acts, the acts comprising:
   receiving a request to move a subject virtual machine from a first computing machine to a migrated virtual machine on a second computing machine;
   determining a set of storage assets within a virtual disk that are accessible by the subject virtual machine, the virtual disk comprising a first portion and a second portion, the first portion corresponding to a bootable portion of an operating system and a second portion corresponding to a mountable volume;
   determining volume metadata pertaining to the second portion of the virtual disk of the subject virtual machine, the volume metadata corresponding to a metadata map of the mountable volume within the virtual disk;
   moving at least some of the first portion corresponding to a bootable portion of the virtual disk to the second computing machine;
   moving the volume metadata pertaining to the second portion of the virtual disk from the first computing machine to the second computing machine;
   starting the migrated virtual machine on the second computing machine by performing a boot sequence, the boot sequence comprising execution of at least some of the bootable portion of the virtual disk;
   mounting the mountable volume on the second computing machine without moving the virtual disk in its entirety, wherein the mountable volume is mounted by accessing the volume metadata that was moved from the first computing machine to the second computing machine; and
   processing storage asset block requests corresponding to the mountable volume that are issued by the migrated virtual machine, wherein the storage asset block requests comprise a retrieval operation for one or more storage asset blocks within the mountable volume that are served by the first computing machine.

12. The computer readable medium of claim 11, further comprising instructions which, when stored in memory and executed by a processor causes the processor to perform, by the second computing machine, a set of pre-fetch operations to prospectively retrieve hot blocks.

13. The computer readable medium of claim 11, wherein the volume metadata comprises at least one of, a parent indication, or a modified flag, or a path, or an extent, or a parent cluster ID, or an origin cluster ID, or a block list, or a mutated block list, or any combination thereto.

14. The computer readable medium of claim 11, wherein the volume metadata comprises at least one of, a volume history, or a hot block list, or any combination thereto.

15. The computer readable medium of claim 14, further comprising instructions which, when stored in memory and executed by a processor causes the processor to perform the acts of analyzing the volume history to determine frequently accessed blocks.

16. The computer readable medium of claim 14, further comprising instructions which, when stored in memory and executed by a processor causes the processor to perform the acts of analyzing the hot block list to determine frequently mutated blocks.

17. The computer readable medium of claim 16, further comprising instructions which, when stored in memory and executed by a processor causes the processor to perform the acts of performing, by the second computing machine, a set of pre-fetch operations to prospectively retrieve blocks from the hot block list.

18. The computer readable medium of claim 11, further comprising instructions which, when stored in memory and executed by a processor causes the processor to perform the acts of moving the volume metadata from the second computing machine to a third computing machine.

19. A system comprising:
   a memory to hold a sequence of instructions; and
   a processor or processors that execute the instructions to causes the processor or processors to perform a set of acts, the acts comprising,
   receiving a request to move a subject virtual machine from a first computing machine to a migrated virtual machine on a second computing machine;
   determining a set of storage assets within a virtual disk that are accessible by the subject virtual machine, the virtual disk comprising a first portion and a second portion, the first portion corresponding to a bootable portion of an operating system and a second portion corresponding to a mountable volume;
   determining volume metadata pertaining to the second portion of the virtual disk of the subject virtual machine, the volume metadata corresponding to a metadata map of the mountable volume within the virtual disk;
   moving at least some of the first portion corresponding to a bootable portion of the virtual disk to the second computing machine;
   moving the volume metadata pertaining to the second portion of the virtual disk from the first computing machine to the second computing machine;
   starting the migrated virtual machine on the second computing machine by performing a boot sequence, the boot sequence comprising execution of at least some of the bootable portion of the virtual disk;
   mounting the mountable volume on the second computing machine without moving the virtual disk in its entirety, wherein the mountable volume is mounted by accessing the volume metadata that was moved from the first computing machine to the second computing machine; and
   processing storage asset block requests corresponding to the mountable volume that are issued by the migrated virtual machine, wherein the storage asset block requests comprise a retrieval operation for one or more storage asset blocks within the mountable volume that are served by the first computing machine.

20. The system of claim 19, further comprising performing, by the second computing machine, a set of pre-fetch operations to prospectively retrieve hot blocks.

* * * * *